Aug. 15, 1933.  C. A. MUDGE  1,922,317
COMMUTATOR
Filed Feb. 1, 1930
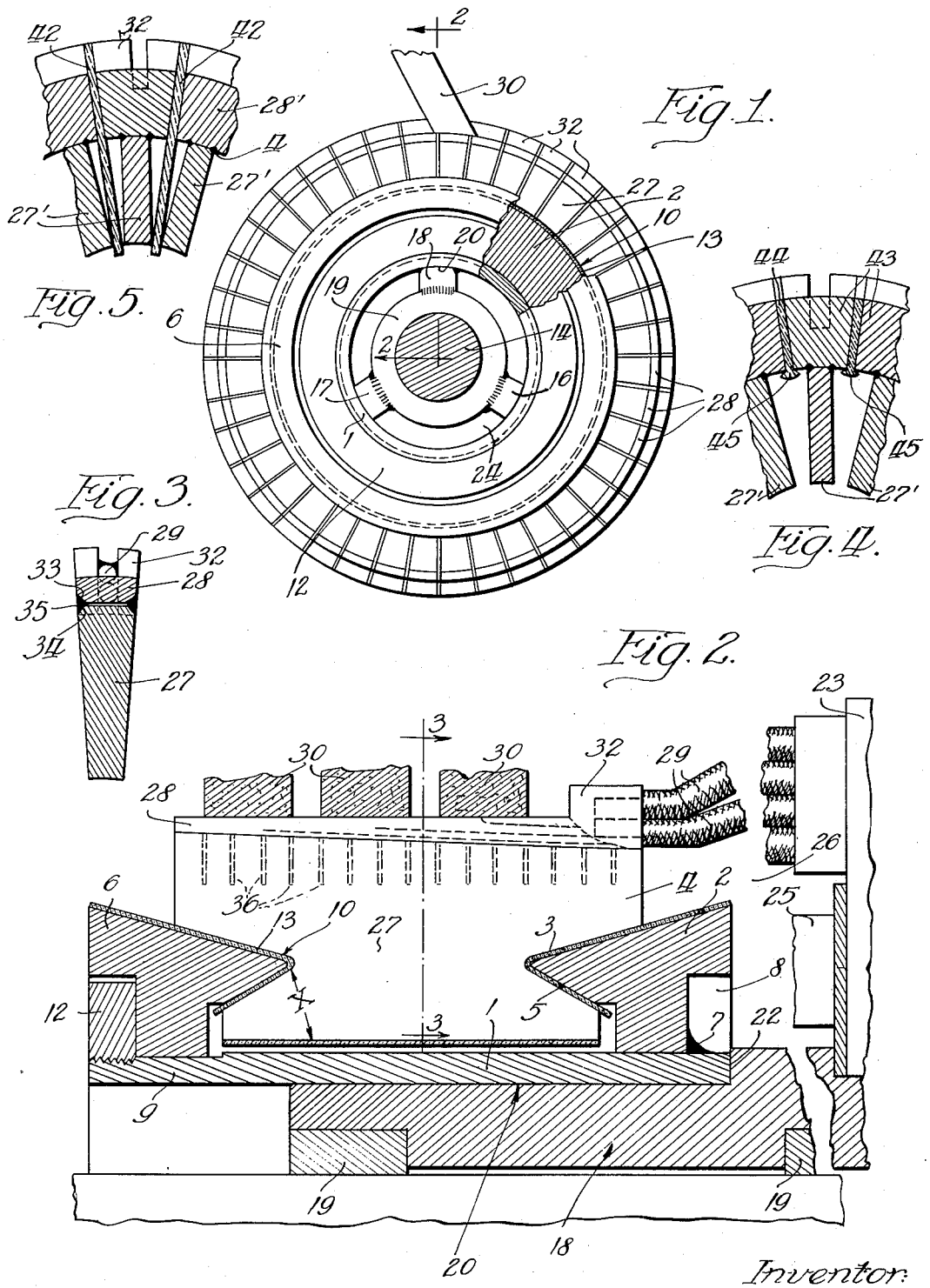

Patented Aug. 15, 1933

1,922,317

UNITED STATES PATENT OFFICE 1,922,317

COMMUTATOR

Charles A. Mudge, Elizabeth, N. J., assignor to Electro Dynamic Company, Bayonne, N. J., a Corporation of New Jersey Application February 1, 1930. Serial No. 425,143

10 Claims. (Cl. 171—321)

My invention relates to commutators and the like for electric machines.

There are two things which the present invention aims to accomplish; first, to make a better commutator and second, to reduce the expense of making commutators.

The problem is complex and unusually difficult to solve. I am aware of numerous attempts to make improvements upon commutators of small motors but heretofore a commutator for a motor, dynamo, rotary converter or the like, of any substantial capacity, has been built practically the same way for the last thirty or forty years. This construction has involved formation of the requisite number of segments or bars of copper. These bars are notched at their ends, flat radial plates of mica disposed between the segments, formed mica rings laid in the registering notches and wedge shaped end rings of steel mounted upon a steel supporting sleeve and drawn up into the registering notches to clamp the bars together.

I have observed that the current carrying capacity of the bars so constructed is far in excess of the actual requirements. That is to say, the amount of copper in a commutator of the prior art is apt to be many times as much as is needed to carry the current and provide the necessary brush contact surface.

Copper has a higher coefficient of expansion and greater heat conductivity than iron has. Due to the greater coefficient of expansion it will swell and shrink under heating and cooling more than will the steel base upon which it is clamped. This, of course, is known and heretofore it has been the practice to make the mica end rings quite thick so as to provide a cushion to take up the contraction and expansion, or "breathing."

The excess of copper heretofore employed has, of course, made a large commutator unduly expensive. The bars must be deep to withstand the radial stresses and to give a sufficient hold at the end for the clamping rings. The weakest section is at the corners, or notches, where the end rings engage the bars, and the necessity for strength at this point limits any possible reduction in the depth of the bars. Copper is structurally not strong, but it is high priced compared to steel, which is very much stronger structurally.

Now, I have conceived the possibility of making up the commutator of wrought steel segments faced with copper of sufficient cross-section at each point to carry the current, provide the desired brush bearing area and having sufficient surplus in depth to take care of wear, re-surfacing, etc.

The preferred way to do this is to form the segments of steel with the usual end notches, form copper facings and lugs for the connection of the armature windings, scarf back the meeting edges of the copper and steel parts and then with a phosphor-bronze welding metal weld the two parts together. The sides may be then finished and the commutator assembled. A commutator so constructed has been satisfactorily operated by me.

The two functions of the commutator, namely the electrical function and the mechanical function are performed by structures peculiarly adapted to each. True the expansion and contraction of the copper under temperature changes still tends to take place but I find I can take care of this satisfactorily in either of several ways. The simplest way is merely to make a strong continuous weld between the copper and the steel, and let the strength of the steel virtually nullify the expansive force of the copper. Another way is to provide sufficient flexibility of connection between the copper and steel to permit the copper to expand and contract at its own rate.

I find the first way effective particularly in connection with the ventilating and cooling system disclosed in my copending application, Serial No. 421,991, filed January 20, 1930. There is a further reason for this, namely, that as most of the heat tends to come to the commutator from the side adjacent the armature and from the friction of the brushes, that heat which reaches the copper part of the commuator is not readily transmitted to the iron or steel center because of the notoriously poor heat conductivity of iron as compared to copper and the fact that the ventilating system of my invention carries away the heat which normally would build up an excessive temperature in the region of the space between commutator and armature.

Since by my new construction the bodies of the commutator bars are of the same metal as the inner tubular sleeve, namely, steel, the two parts contract and expand together i. e., at the same rate and hence no tendency to loosen or to wear out the mica end ring insulation occurs. In fact, I find that I can keep the connection so tight and free of differences of expansion that much thinner end insulating rings of mica or the like will now serve the purpose. A much higher clamping pressure may be employed because of the strength of the steel bars.

Thereby the commutator tends to remain true and tight and the construction involves a very considerable reduction in the resulting cost of the commutator. The conductivity of wrought copper is higher than that of the cast metal and hence I prefer to roll or forge the facing bars and weld or otherwise secure them onto the wrought steel bars.

While I have above specified one particular method of attaching a rolled or forged copper facing upon the wrought steel segment, I do not intend to limit the invention to a commutator so made as there are other ways of producing a steel core commutator. Also there are other ways of forming a copper facing upon the steel body of the segment.

Now in order to acquaint those skilled in the art with the manner of constructing and operating a device embodying my invention I shall describe in connection with the accompanying drawing a specific embodiment of the same.

Figure 1 shows an end view with a part broken away of a commutator embodying my invention.

Figure 2 is a section taken on the line 2—2 of Figure 1.

Figure 3 is a cross-section through one of the bars as viewed on the line 3—3 of Figure 2.

Figure 4 is a fragmentary section of a modified form of a commutator embodying the invention and Figure 5 is a similar section of a further modification.

The commutator which I have herein shown comprises a tubular sleeve member 1 which forms the base or frame portion of the commutator. This steel tube has a forged steel end ring 2 mounted upon the rear or right hand end of the same as viewed in Figure 2. This end ring is wedge-shaped in cross-section for the purpose of entering a corresponding notch 3 in the rear end of the commutator bars 4. A thin ring of mica or other suitable insulation 5 which is V shaped in cross-section and fits over the wedge-ring 2 and separates the wedge ring from the notch 3 is disposed between these parts.

At the front end of the tube 1 a similar movable wedge ring 6 is provided.

The wedge ring 2 is held rigidly in place and fixed to the sleeve 1 by a line of welding 7 disposed in the annular recess 8. It may be otherwise secured to or formed integral with the sleeve 1.

The front or movable ring 6 which may be formed substantially identical with the ring 2, in fact, it is a similar forging, fits relatively closely upon a finished surface 9 on the front end of the sleeve 1 to be guided thereupon, and is forced into the notch 10 in the segment such as 4 by means of a screw-threaded ring 12, threaded upon the outer end of the sleeve 1. A similar ring of mica or like insulation 13 is disposed between the front ring 6 and the commutator bars.

Heretofore when copper bars have been employed the section at X has been the critical section. It is here that the greatest stress occurs and when copper is used the depth of the bar is dependent upon the stress occurring at this point.

The steel frame which is thus formed and which holds the bars 4 in place may be mounted directly upon the shaft of the rotating part, for example, upon the armature shaft of a motor, generator, converter or the like. In one form of my invention the tubular base 1 is spaced from the shaft 14 by means of bars 16, 17 and 18 (Fig. 1) forming parts of the armature barrel in the construction illustrated. These bars are welded to two or more rings such as 19. The rings such as 19 are forced upon the shaft 14 with a pressed fit and the bars are machined to a true cylindrical surface as indicated at 20 to receive the sleeve 1 thereupon, this sleeve being pressed upon the bars 16, 17 and 18 to a point where the sleeve 1 is stopped by the shoulder 22. These bars form lands spacing the commutator from the shaft.

The armature 23 is likewise mounted upon the bars 16, 17 and 18 of the barrel, all as disclosed in my co-pending application Serial No. 421,991, filed January 20, 1930. It will be observed that the sleeve 1 is spaced from the ring 19 so that an annular passageway 24, interrupted only by the bars 16, 17 and 18, exists between said sleeve 1 and the ring 19.

In the preferred embodiment of the invention the armature 23 is provided with blower vanes such as are indicated at 25 at each end of the armature 23 and these blower vanes drive the air circumferentially, causing it to develop sufficient centrifugal force to cause it to flow outwardly and thereby induce a strong current of air axially along the shaft 14 through the passageway 24 and then radially outwardly through the space 26 between the commutator and the armature 23; thereby, the commutator, as well as the armature and the end turns and commutator connections are successfully ventilated.

The commutator segments, such as 4 shown in Figure 2, comprise a central or main body portion 27, formed of wrought steel or like inexpensive and structurally strong metal with an outer facing 28 of copper or an alloy of copper suitable for the purpose. Preferably wrought copper is employed for this purpose. The facing 28 is required to be of sufficient wearing depth and only of such cross-section as will satisfactorily conduct the current from the armature leads such as 29 to the brushes which are indicated at 30. The facing may therefore be tapered as shown. The armature leads are suitably connected, electrically and mechanically, to the lugs or ears 32 formed on the facing bar 28 and it can be seen that a relatively small amount of copper is all that is required to be of sufficient wearing depth and to conduct the current carried by the armature leads 29 and provide sufficient brush-contacting surface for the brushes 30—30. Since the outer brush 30 carries only a part of the load and hence only a part of the current needs to flow substantially the full length of the commutator facing bar 28, this bar 28 may be tapered in cross-section further to diminish the amount of copper required.

The commutator bars 4, both including the steel center portion and the facing 28 are machined or drawn to have flat, substantially radial faces and these faces are separated by interposed plates of mica or the like.

The manner of securing the facing 28 upon the body 27 may be widely varied. It may be formed mechanically, as by dove-tailing the parts together. Preferably I unite the two parts by bonding the two metals together as by welding or the like. In one form of my invention I chamfer off the adjacent corners 33 and 34 on each side and deposit in the V shaped recess so formed welding metal by means of a welding arc or the like, this metal comprising phosphor-bronze or some like material which will unite with both the copper and the steel parts. The meeting faces of the parts 28 and 27 may be flat or cylindrical, as desired.

In another embodiment of the invention I have deposited a facing of molten copper directly upon the upper face of the bar center 27 by arc welding or gas welding and thus built up an autogenous facing.

If the facing 28 and the core 27 are to be secured together by mechanical joining, as by dove-tailing, the dove-tails may run crosswise or run longitudinally. Where the dovetails run longitudinally the rear end, that is, the right hand end of the facing 28 and the core 27 are preferably joined by a line of welding metal of phosphor-bronze or the like which bonds successfully to both copper and steel.

The thickness of the facing 28 should be great enough to take care of wear and future re-surfacing or dressing of the commutator. The copper facing 28 may be varied in cross-section substantially proportional to the amount of current which is to be carried so that the current density throughout is substantially the same. The current density in the facing may then be of the same order as the current density in the armature copper.

Because of the greater strength of the core portion 27 of the commutator less metal is required to provide the same degree of strength and hence the commutator may be made lighter than has heretofore been the practice. At the same time it is to be observed that the specific gravity of iron is appreciably lower than copper.

In use, the variations in temperature to which the commutator, if it is of not unusual length, is subjected have very little effect, since the core portion 27 and the rings 2, 6 and the sleeve 1 are made of the same metal and these parts have the same coefficient of expansion. As a result the mica rings 10 and 3 may be made much thinner and the bars 4 held more securely than has heretofore been the case. The strength of the steel core portion 27 as compared with the strength of the facing section 28 is so great that the difference in contraction and expansion of the two parts has no appreciable effect.

If desired, the outer face of each bar 27 may be slotted with saw slots as indicated in dotted lines by reference numeral 36 on Figure 2 to permit the copper facing 28 to expand freely while retaining the necessary bond and mechanical strength. These slots 36 are formed in the face of the bar section 27 before the facing 28 is secured thereto.

Although the wedge shape of the bar 28 (see Figure 3) is theoretically correct it is found more practical to use a uniform section, that is, with the sides parallel, as these bars or segments are drawn through a die to give them proper shape.

If desired the conducting bar 28 may be made of uniform section throughout its length. The bar 27 need not be wedge shaped in cross-section but may be rectangular, as indicated at 27' in Figure 5. It is easier to secure bars of rectangular section and they may serve equally well in the construction, as indicated in Figure 5, these rectangular bars 27' being welded to the bottom or inner surfaces of the copper segments 28'.

The mica segments between bars, indicated at 42, may extend between the copper commutator segments 28' and down between the steel segments 27', as shown in Figure 5, this being desirable on smaller commutators where the space between the steel or like metal segments 27', 27' is relatively small, the mica separators or plates preventing contact or conduction of current between said bars 27', 27' at their convergent ends.

Where the copper segments such as 43, shown in Figure 4 are fairly wide and the inner ends of the bars 27', 27' are spaced apart a sufficient distance, the mica plates 44 need extend only between such copper segments 43 as indicated in Figure 4. The mica not being compressed below the copper segments 43 will, during seasoning, or baking, "fan out" as indicated at 45 and form an enlargement which anchors it against movement under the centrifugal force which is developed by rotation.

In the construction shown in Figure 4 and the construction shown in Figure 5 the outer edges of the steel bars 27', 27' are joined to the inner surfaces of the copped bars as explained in connection with Figure 3, that is, by scarfing or chamfering to provide a groove in which welding metal may be deposited for joining the two parts together. Any suitable metal which will bond to the steel and to the copper, or to other dissimilar metals which may be used, may be employed. If desired, cooperating grooves may be formed in the bottom of the copper bars.

These bars 27', 27' are provided with notches at their ends as shown in Figure 2, for engagement by wedge rings such as 2 and 6, respectively.

While I refer to the use of iron or steel as the metal of which the central portion of the commutator is constructed and this is the preferred construction, I do not intend to limit the invention to this specific material, as any suitable material of the desired characteristics may be employed instead. Likewise, instead of copper, any suitable material may be employed.

I do not intend to be limited to the details shown or described.

I claim:

1. A commutator comprising a plurality of insulated segments, means clamping the segments together, insulation between the segments and said clamping means, said segments and said clamping means being composed of materials having substantially the same coefficients of expansion, whereby the stress in the insulation is not appreciably altered upon expansion of the members by increase of temperature, and a layer of metal of high electric conductivity secured to the outside of each of the segments, each of said layers varying in thickness throughout its length in proportion to the current which it is required to carry.

2. In a rotary dynamo electric machine having an insulated winding, a commutator comprising a plurality of segments insulated from one another, a rotatable shaft in which said segments are secured, each of said segments comprising an inner section of high mechanical strength, such sections being secured rigidly together, and connections between the winding and the outer sections of the respective commutator segments said conducting sections being of a cross-sectional area such that the current density therein will be of approximately the same order as that of the current density in the winding, and a plurality of brushes aligned lengthwise of the commutator section and establishing electrical contact therewith, said outer conducting section of the commutator segments being of smaller cross-section than the inner end of the same, whereby the current density throughout the section may be of approximately the same value.

3. In combination, a shaft, a barrel comprising a plurality of rings, spaced bars connecting said rings and forming lands upon said shaft, and a commutator having a tubular frame member embracing and supported upon said bars.

4. In combination, a shaft, a barrel comprising a ring, a plurality of bars extending longitudinally of said shaft and being fastened upon the outside of the ring and providing radially projecting and longitudinally extending lands, and a commutator embracing said lands and resting upon the same, said ring lying under said commutator.

5. In combination, a shaft, a barrel comprising a plurality of rings, bars connecting said rings and forming lands upon said shaft, a commutator having a tubular frame member embracing and supported upon said bars, and means for inducing a draft of air through the space between the tubular frame member and the shaft.

6. In combination, a shaft having a plurality of lands thereupon, a commutator having a tubular sleeve, wedge rings upon said sleeve and bars held by said wedge rings, said sleeve being pressed upon said lands, and a blower for drawing air through said tubular frame member and discharging the same radially along the rear end of the commutator.

7. In combination, a shaft having lands, a commutator comprising a tubular frame supported on said lands, an armature on the shaft, conductors from said armature to said commutator, a blower disposed between the commutator and the armature drawing air through said tubular frame and discharging the same outwardly past said conductors.

8. A commutator comprising copper bars having cylindrical outer surfaces and having steel bars of rectangular cross-section welded to their inner surfaces and mica plates extending between the copper segments, said steel bars being out of contact with said mica plates.

9. A dynamo electric machine commutator bar comprising an outer contact section of material having high electric conductivity joined at its base to a single thin metallic reenforcing and supporting plate of appreciably lesser thickness than the width of the contact section and extending along the longitudinal center of the base of the contact section.

10. A commutator having segmental commutator bars each comprising an outer contact section of material having high electric conductivity joined at its base to a single thin metallic reenforcing and supporting plate of appreciably lesser thickness than the width of the contact section and extending along the longitudinal center of the base of the contact section, and solid insulation between adjacent commutator bars and between the radially inner ends of the reenforcing plates, the intermediate radial surfaces of the two opposite sides of each reenforcing plate being free of contact with solid insulation and constituting heat radiating surfaces.

CHARLES A. MUDGE.